United States Patent
Oh (12)

(10) Patent No.: US 6,295,280 B1
(45) Date of Patent: *Sep. 25, 2001

(54) METHOD FOR NETWORK NODE RECOGNITION

(75) Inventor: Joong Chan Oh, Kyungki-do (KR)

(73) Assignee: Hyundai Electronics Industries Co., Ltd., Kyoungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,296

(22) Filed: Mar. 5, 1998

(30) Foreign Application Priority Data

Mar. 5, 1997 (KR) .................................... 97-7279

(51) Int. Cl.[7] .................................... H04L 12/28
(52) U.S. Cl. ..................... 370/254; 370/401; 709/220
(58) Field of Search ..................... 370/445, 446, 370/401, 407, 408, 457, 463, 420, 392, 241–5, 252, 254; 709/220, 221, 222, 223–6, 227–9

(56) References Cited

U.S. PATENT DOCUMENTS

| 5,446,735 | | 8/1995 | Tobagi et al. .................. 370/445 |
| 5,706,440 | * | 1/1998 | Compliment et al. .............. 709/224 |
| 5,907,544 | * | 5/1999 | Rypinski ..................... 370/337 |
| 5,920,699 | * | 7/1999 | Bare ....................... 395/200.55 |
| 5,982,778 | * | 11/1999 | Mangin et al. ................. 370/445 |
| 6,044,076 | * | 3/2000 | Yamamoto ..................... 370/392 |

OTHER PUBLICATIONS

Stevens, TCP/IP Illustrated, vol. 1, pp. 56–58, 1994.*

* cited by examiner

*Primary Examiner*—David R. Vincent

(57) ABSTRACT

A method for node recognition in data transmission between a switching hub and a plurality of network interface cards (NICs) is disclosed, including the steps of transmitting an information-demanding signal demanding information of each of the NICs; transmitting information of each of the NIC and information of whether or not there is a node recognition demand according to the information-demanding signal; and forming an information table by use of the transmitted information, and outputting a data into the NIC which has sent a signal of whether or not there is a node recognition demand.

8 Claims, 4 Drawing Sheets

FIG.5
prior art

| preamble | SFD | DA | SA | size/type | DATA | FCS |

FIG.6a

| preamble | SFD | DA | SA | FFFF'H | node recognition demand signal | information | FCS |

FIG.6b

| preamble | SFD | DA | SA | FFFF'H | information demand signal | information | FCS |

METHOD FOR NETWORK NODE RECOGNITION

BACKGROUND OF THE INVENTION

1. Field of the Invention

The present invention relates to communications in networks and, more particularly, to a method for transferring information (station address, multi-cast address) concerning a network interface card (NIC) connected to a switching hub, into the switching hub by receiving and transmitting an information-demanding packet and a recognition packet between the switching hub and the Network Interface Card.

2. Discussion of the Related Art

A conventional method for node recognition will be described with the accompanying drawings.

FIG. 1 is a structural schematic view of a network for describing a conventional method of node recognition, and FIG. 2 is a structural block diagram of the switching hub of FIG. 1.

As described in FIG. 1, a network is composed of a switching hub 11 and a plurality of stations 12 connected to the switching hub 11 for receiving and transmitting data to and from the switching hub 11.

A software 11a for managing a switching hub is in the switching hub 11. Each of the stations 12 includes a network interface card (NIC) 12a for transmitting and receiving data to and from the switching hub 11 and a software driver 12b for managing the NIC 12a.

Referring to FIG. 2, the switching hub 11 is composed of a memory part 11b; a controller 11c for controlling the memory part 11b, the MACS 11d, and the overall operations of the switching hub 11; a plurality of media access controllers (MAC) 11d connected to the controller 11c in parallel; and a plurality of physical layers (PHYs) 11e connected to each of the MACS 11d for making data suitable for communication protocol.

The MAC 11d converts data transmitted from a software driver 12b located in each station 12 into data suitable for Ethernet protocol for transmitting the converted data to the PHYs 11e, and transmits data from the PHY 11e to the software driver 12b. The PHY 11e converts a digital data signal transmitted from the MAC 11d into an electrical data signal, which is transmitted to another station 12 through a cable, and converts the electrical data signal transmitted through a cable into a digital data signal which is transmitted to the MAC 11d.

FIG. 3 is a structural block diagram of the NIC of FIG. 1, which is composed of the PHY 11e for converting an electrical signal transmitted through a cable into a digital data signal, and the MAC 11d for transmitting the digital data signal to the software driver 12b.

FIG. 4 is a structural block diagram of a conventional MAC which is composed of a receiving circuit 12c for receiving a data signal transmitted from the PHY 11e, a first buffer 12d for storing the data signal received by the receiving circuit 12c for a predetermined time, a system interface 12e for interfacing the data signal outputted from the first buffer 12d for making the data signal suitable for system protocol, a second buffer 12f for temporarily storing the data signal outputted from the system interface 12e, and a transmitting circuit 12g for transmitting the data signal stored in the second buffer 12f to the PHY 11e.

Since, in the network, the switching hub 11 selectively relays data, the switching hub 11 has to know the address and other information of each station 12 having an NIC 12a therein.

The communication process between the switching hub 11 and the NIC 12a in each station 12 will be described below.

First, the switching hub 11 prepares an information table for each station 12 and transmits data to a station 12 although the switching hub 11 may have no information regarding the station 12 it transmits to. For example, a station that the switching hub 11 has no information about would be a newly added station. If a station is newly added, the switching hub 11 does not recognize the new station address and cannot form an information table for the new station. Accordingly, the switching hub 11 unnecessarily transmits data to the new station 12 that it has no information about, because the switching hub 11 cannot determine whether the new station 12 actually wants to receive data.

Since the switching hub 11 transmits all data into newly-added stations, the newly-added stations have relatively heavy data traffic. If a packet is sent into the switching hub 11 from the newly-added station 12 which has received all the data transmitted from the switching hub 11, the switching hub 11 then analyzes the packet so as to form an information table. Once the information table has been formed, the switching hub 11 transmits data into the stations 12 according to the information table.

FIG. 5 shows a packet transmitted from the switching hub 11 to each station 12. All data are transmitted in the unit of packets. First, a source address (SA) and then a destination address (DA) are successively recorded in the packet. Thereafter, the size and form of the data are recorded. Subsequently, the packet in which the foregoing information is recorded is transmitted from the switching hub 11 to each station 12, and from each station 12 back to the switching hub 11. Accordingly, if a station is newly added, the packet does not indicate whether the new station wants to receive data.

A conventional method for node recognition has the following problems.

First, until a data is sent from a newly-added station, a switching hub cannot form an information table, thereby increasing data traffic of the newly-added station.

Second, if two or more stations are newly added, traffic of the entire network becomes heavier in case of employing a multi-cast technique, although data are sent from the newly-added stations so that the switching hub forms information tables.

SUMMARY OF THE INVENTION

Therefore, the present invention is directed to a method for node recognition that substantially obviates one or more problems due to limitations and disadvantages of the related art.

The invention provides a method for node recognition in which an information demanding packet is recognized and a recognition packet is transmitted by a station, more particularly, by a network interface card in the station, allowing a switching hub to easily form an information table, thereby preventing the increase of data traffic even when multi-cast techniques are used.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for node recognition in data transmission between a switching hub and a plurality of NICs includes the steps of transmitting an information demanding signal demanding information concerning each of the network interface cards; transmitting information of the NIC and a signal of whether or not there is a node recognition demand according to the information-demanding signal; and forming an information table by use of the transmitted information and outputting data into the NIC which has sent the signal of whether or not there is a node recognition demand.

It is to be understood that both the foregoing general description and the following detailed description are exemplary and explanatory and are intended to provide further explanation of the invention as claimed.

BRIEF DESCRIPTION OF THE DRAWINGS

These and various other objects, features, and advantages of the present invention will be readily understood with reference to the following detailed description read in conjunction with the accompanying drawings, in which:

FIG. 5 is a view showing a form of a packet transmitted between a switching hub and a station according to a conventional method for node recognition;

FIG. 6a is a view showing a form of a packet in which there is recorded an information-demanding signal sent from a switching hub to a station according to a method for node recognition of the present invention;

FIG. 6b is a view showing a form of a packet in which there is recorded a node recognition demand information sent from a station to a switching hub according to the method for node recognition of the present invention.

DETAILED DESCRIPTION OF THE PREFERRED EMBODIMENTS

Reference will now be made in detail to the preferred embodiments of the present invention, examples of which are illustrated in the accompanying drawings.

FIG. 6a is a view showing a form of a packet in which there is recorded an information-demanding signal sent from a switching hub to a station according to the method for node recognition of the present invention and FIG. 6b is a view showing a form of a packet in which there is recorded a node recognition demand information sent from a station to a switching hub according to the method for node recognition of the present invention.

When a new connection is made, a switching hub detects the presence of the new connection, and a switching hub transmits a packet in which an information-demanding signal is recorded, to the newly added station. An NIC of each station recognizes the information-demanding signal and transmits a signal of whether or not there is a node recognition demand to receive data. The switching hub is able to output information-demanding signals and recognize node recognition demand signals transmitted from the NIC.

A network is composed of a switching hub and NICs according to the present invention and the process for sending data to the NIC of a corresponding station after the formation of an information table for stations will be described.

First, the switching hub sends to each NIC a packet in which an information-demanding signal is recorded. Each NIC analyzes the packet sent from the switching hub and transmits to the switching hub a packet which contains the NIC's information (i.e. station address, etc.).

The switching hub receives the packet transmitted from the NIC so as to form an information table. Then, the switching hub transmits data to each station by using the information table. However, if there is a new NIC different from the NIC information already recorded in the information table, that is, if a new NIC is added to the network, the information exchange between the switching hub and the new NIC will be described below.

If a new NIC is added, the switching hub recognizes the new NIC and sends a packet having an information-demanding signal to the new NIC. Thereafter, the switching hub receives the packet from the new NIC and then forms an information table. When the new NIC sends node recognition information indicating that it wants to receive data, the switching hub sends data to the NIC of the corresponding station with reference to the station address recorded in the information table.

Figure 1:
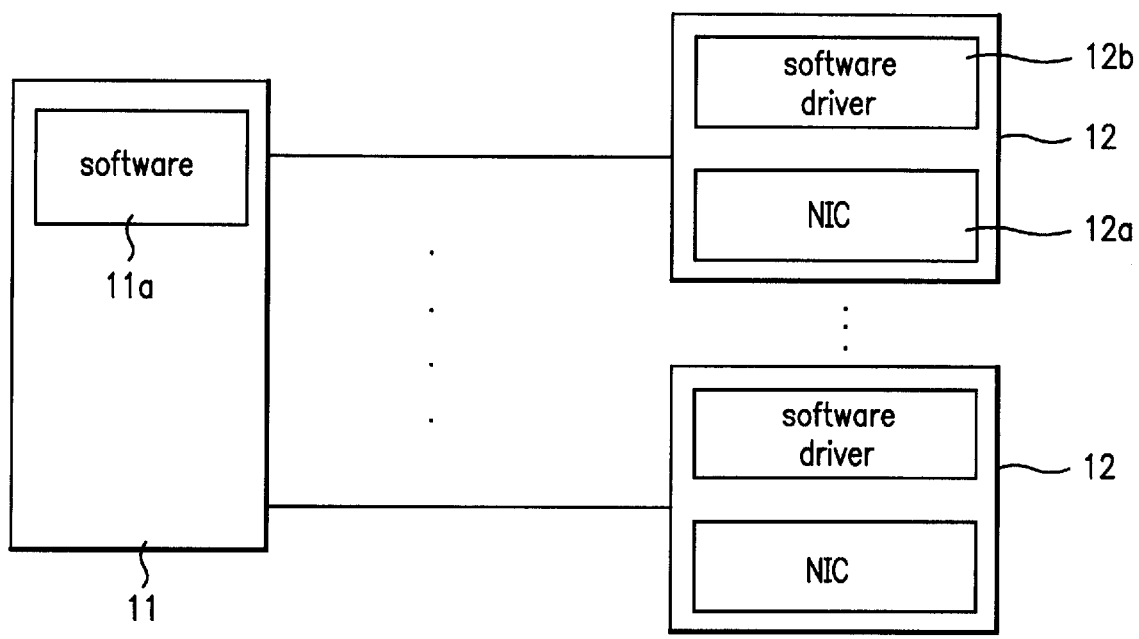
FIG. 1 is a schematic diagram of the structure of network for describing a conventional method for node recognition.
Figure 2:
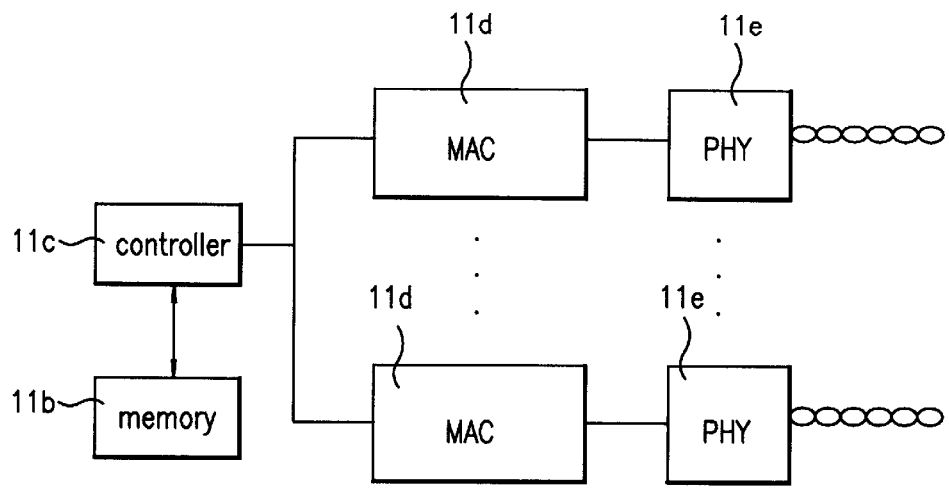
FIG. 2 is a structural block diagram of the switching hub of FIG. 1.
Figure 3:
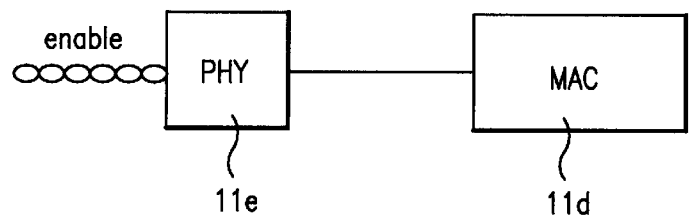
FIG. 3 is a structural block diagram of the network interface card (NIC) of the FIG. 1.
Figure 4:
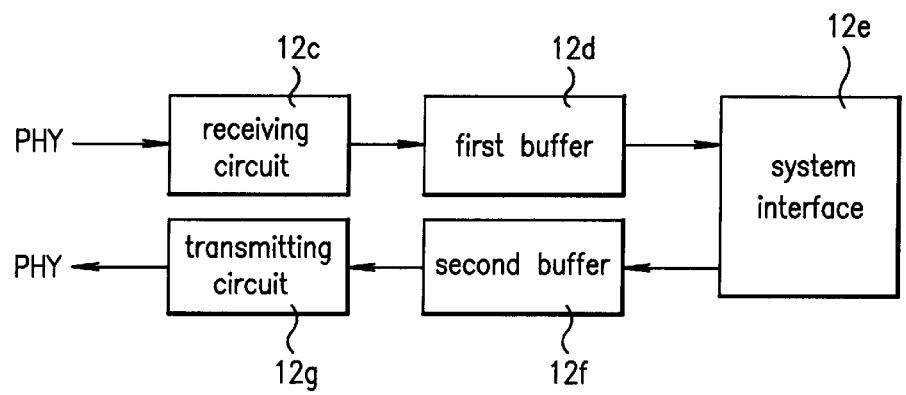
FIG. 4 is a structural block diagram of a general media access control (MAC)
Figure 7:
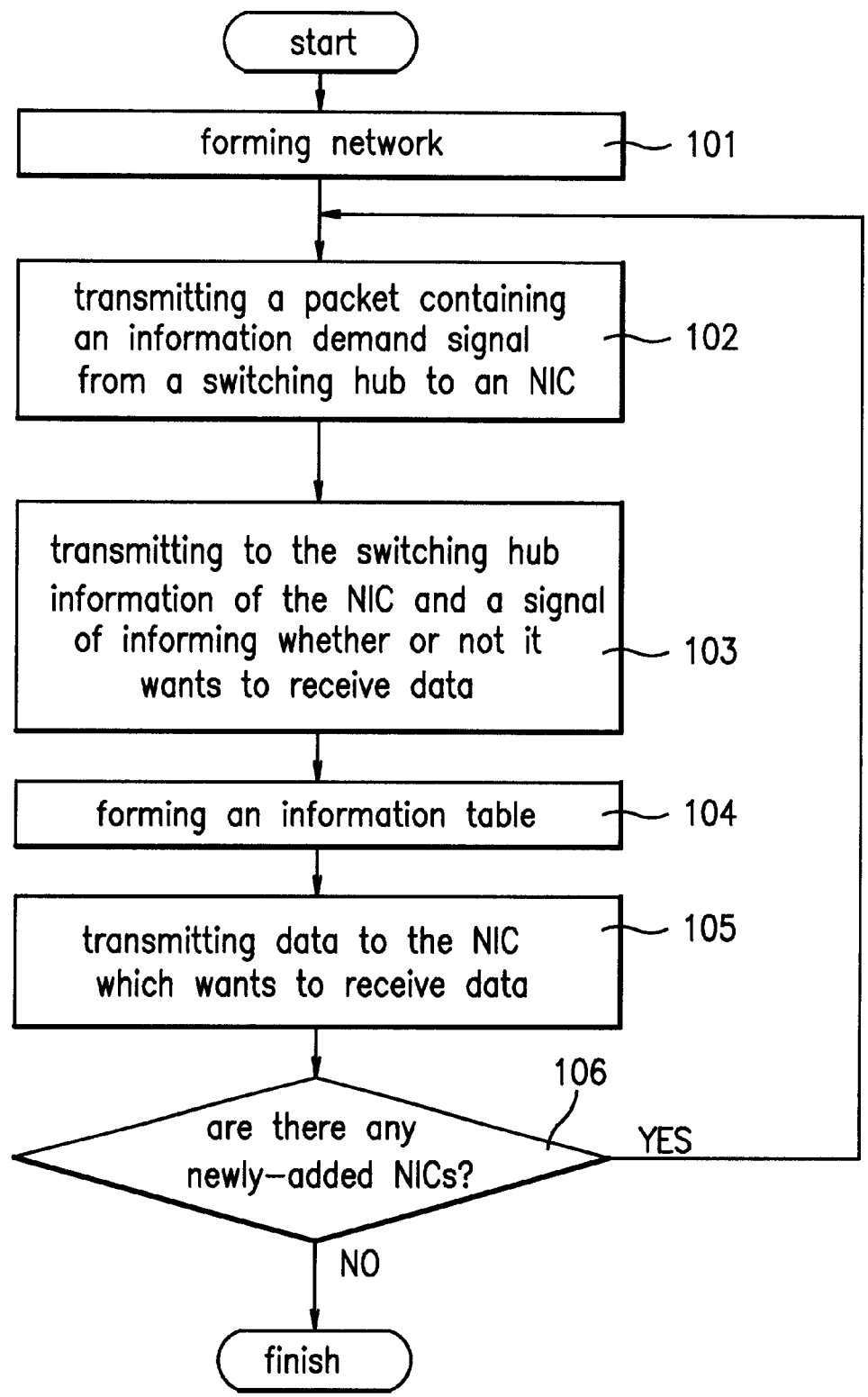
FIG. 7 is a flow chart describing the method for node recognition according to the present invention.

FIG. 7 is a flow chart for describing the method for node recognition. As shown in FIG. 7, after a network is formed (101), the switching hub transmits into each NIC a packet in which an information-demanding signal is recorded (102). Subsequently, each NIC analyzes the packet and then sends a packet containing its own information as well as information of whether or not it wants to receive data (103). Next, the switching hub receives the packet from each NIC so as to form an information table (104), and then transmits a data into each NIC which wants to receive a data (105). Thereafter, it is determined whether or not there is a new NIC (106). If there is a new NIC, the switching hub sends a packet having an information-demanding signal to the new NIC (102). Accordingly, the new NIC analyzes the packet and then sends to the switching hub its own information as well as information of whether or not it wants to receive data, again.

The method for node recognition of the present invention has the following advantages.

First, a new NIC transmits to a switching hub its own information as well as information of whether or not it wants to receive data, so that the switching hub can easily form an information table.

Second, since the switching hub can easily form an information table, the increase of data traffic is prevented even if a plurality of NICs are added.

It will be apparent to those skilled in the art that various modification and variations can be made in the method for node recognition of the present invention without departing from the spirit or scope of the inventions. Thus, it is intended that the present invention cover the modifications and variations of this invention provided they come within the scope of the appended claims and their equivalents.

What is claimed is:

1. A method for node recognition between a switching hub and a plurality of workstations comprising network interface cards (NICs), the method comprising:

transmitting a first signal to each NIC, demanding information therefrom;

transmitting to the switching hub, information of each NIC and a second signal indicating whether or not each NIC wants to receive data;

forming an information table for each NIC using newly acquired NIC information; and transmitting data to only those NIC(s) which want to receive data based on the formed information table.

2. The method of claim 1, wherein:

transmitting the first signal includes, transmitting to each workstation a first packet in which a first information-demanding signal is recorded; and transmitting the second signal includes, analyzing said first packet and then transmitting from a workstation to the switching hub a second packet comprising a MAC address.

3. The method of claim 2, wherein the step of forming an information table comprises:

determining from the second packet whether or not there is a newly-added workstation, and transmitting to the newly-added workstation a third packet in which a second information-demanding signal is recorded;

transmitting from the newly-added workstation to the switching hub, a fourth packet comprising node recognition demand data which indicates whether or not the newly-added workstation wants to receive data; and forming by the switching hub an information table for each workstation using newly acquired information.

4. The method of claim 1, wherein:

transmitting the first signal includes, sending a packet having an information requesting signal; and transmitting the second signal includes, sending station information from a station in response to the information requesting signal.

5. The method of claim 4, wherein said station information includes network interface card information.

6. The method of claim 5, wherein said network interface card information indicated whether or not said network interface card wants to receive data.

7. The method of claim 4, wherein forming an information table is performed at the switching hub.

8. A method of network node recognition in a network having a switching hub and a plurality of stations, each station being a node of said network, the method comprising:

receiving, from a switching hub, a packet having an information requesting signal;

sending, from a station to the switching hub, station information in response to the information requesting signal, the station information including an indication whether the station should receive data; and receiving data from the switching hub if the station should receive data.

* * * * *